United States Patent
Keskkula et al.

(10) Patent No.: US 9,686,189 B2
(45) Date of Patent: Jun. 20, 2017

(54) ROUTING DATA IN A BI-DIRECTIONAL COMMUNICATION SESSION OVER AN OVERLAY NETWORK USING RELAY NODES

(71) Applicant: Microsoft Technology Licensing, LLC, Redmond, WA (US)

(72) Inventors: Silver Keskkula, Tallinn (ES); Tony Bates, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 13/727,392

(22) Filed: Dec. 26, 2012

(65) Prior Publication Data
US 2014/0177460 A1 Jun. 26, 2014

(51) Int. Cl.
*H04L 12/721* (2013.01)
*H04L 12/735* (2013.01)
(Continued)

(52) U.S. Cl.
CPC ............ *H04L 45/70* (2013.01); *H04L 45/128* (2013.01); *H04L 45/3065* (2013.01);
(Continued)

(58) Field of Classification Search
CPC .......... H04B 7/14; H04Q 7/20; H04L 45/025; H04L 45/64
(Continued)

(56) References Cited

U.S. PATENT DOCUMENTS 7,620,033 B2 11/2009 Chu et al.
7,672,235 B1 3/2010 Lian et al.
(Continued)

FOREIGN PATENT DOCUMENTS

CN 1625873 6/2005
CN 101729365 6/2010
(Continued)

OTHER PUBLICATIONS

Gurtov, Andrei, "Efficient Data Transport in Wireless Overlay Networks", Retrieved at <<http://ethesis.helsinki.fi/julkaisut/mat/tieto/vk/gurtov/efficien.pdf>>, Academic Dissertation in University of Helsinki, Faculty of Science, Department of Computer Science and International Computer Science Institute, Berkeley, Apr. 24, 2004, pp. 155.
(Continued)

*Primary Examiner* — Yemane Mesfin
*Assistant Examiner* — Peter Chen

(57) ABSTRACT

Routing data in a bi-directional communication session over an overlay network is described. One-way performance measurements are determined for routing data in the communication session in a first direction from a first node to a second node via a respective plurality of relay nodes of the overlay network. Based on the performance measurements, relay node(s) are selected for use in routing data in the first direction from first node to second node. Data is routed in the communication session from the first node to the second node over the overlay network via the selected relay node(s). The selection of the relay node(s) for use in routing data in the first direction is performed separately to selection of one or more relay node for use in routing data in a second direction from the second node to the first node in the communication session.

20 Claims, 2 Drawing Sheets

(51) Int. Cl.
*H04L 12/725* (2013.01)
*H04L 12/729* (2013.01)
*H04L 12/727* (2013.01)
*H04L 12/715* (2013.01)
*H04L 29/08* (2006.01)
*H04L 12/26* (2006.01)

(52) U.S. Cl.
CPC ........ *H04L 43/087* (2013.01); *H04L 43/0835* (2013.01); *H04L 43/0841* (2013.01); *H04L 43/0858* (2013.01); *H04L 43/0876* (2013.01); *H04L 43/106* (2013.01); *H04L 45/121* (2013.01); *H04L 45/125* (2013.01); *H04L 45/64* (2013.01); *H04L 67/104* (2013.01)

(58) Field of Classification Search
USPC .......................... 370/252, 315, 400; 709/223
See application file for complete search history.

(56) References Cited

U.S. PATENT DOCUMENTS

| | | | |
|---|---|---|---|
| 8,249,057 | B1 | 8/2012 | Mohaban et al. |
| 8,621,079 | B2* | 12/2013 | Van Wie et al. ............... 709/226 |
| 2001/0037409 | A1* | 11/2001 | Ricciulli ............... F25B 41/003 |
| | | | 719/310 |
| 2003/0152028 | A1* | 8/2003 | Raisanen et al. ............. 370/235 |
| 2008/0049637 | A1 | 2/2008 | Morrill et al. |
| 2008/0049746 | A1* | 2/2008 | Morrill et al. ................ 370/389 |
| 2008/0108369 | A1* | 5/2008 | Visotsky et al. .............. 455/455 |
| 2009/0024736 | A1* | 1/2009 | Langille et al. .............. 709/224 |
| 2009/0092072 | A1* | 4/2009 | Imamura et al. ............. 370/315 |
| 2009/0323700 | A1* | 12/2009 | Schwan et al. ............... 370/400 |
| 2010/0014528 | A1 | 1/2010 | Amir et al. |
| 2010/0067427 | A1* | 3/2010 | Choudhury ................... 370/315 |
| 2010/0246480 | A1* | 9/2010 | Aggarwal et al. ............ 370/328 |
| 2011/0267952 | A1* | 11/2011 | Ko et al. ....................... 370/237 |
| 2012/0036248 | A1* | 2/2012 | Naqvi et al. .................. 709/223 |
| 2012/0087297 | A1* | 4/2012 | Park et al. .................... 370/315 |
| 2012/0124606 | A1 | 5/2012 | Tidwell et al. |

FOREIGN PATENT DOCUMENTS

| | | |
|---|---|---|
| CN | 202178777 | 3/2012 |
| WO | WO-0079730 | 12/2000 |
| WO | WO-0251052 | 6/2002 |

OTHER PUBLICATIONS

Mahy, et al., "Traversal Using Relays around NAT (TURN) Relay Extensions to Session Traversal Utilities for NAT (STUN)", Retrieved at <<http://tools.ietf.org/html/rfc5766>>, Internet Engineering Task Force (IETF), Apr. 2010, pp. 68.

Agapi, et al., "Accurate relay selection for improved multipath throughput in Internet overlays", Retrieved at <<http://r3.cis.upenn.edu/paperspdfs/1569291193.pdf>>, Retrieved Date: Oct. 12, 2012, pp. 8.

Seedorf, et al., "Application Layer Traffic Optimization (ALTO) Problem Statement", Retrieved at <<http://tools.ietf.org/html/rfc5693>>, Proceedings: Internet Engineering Task Force (IETF), Oct. 2009, pp. 15.

"International Search Report and Written Opinion", Application No. PCT/US2013/077733, Apr. 3, 2014, 11 pages.

"International Preliminary Report on Patentability", Application No. PCT/US2013/07773, Mar. 17, 2015, 10 pages.

"Second Written Opinion", Application No. PCT/US2013/077733, Dec. 3, 2014, 7 pages.

"Foreign Office Action", RU Application No. 2015125312, Jul. 24, 2015, 3 pages.

"Foreign Office Action", CN Application No. 201380068289.4, Mar. 31, 2017, 11 pages.

* cited by examiner

US 9,686,189 B2

ROUTING DATA IN A BI-DIRECTIONAL COMMUNICATION SESSION OVER AN OVERLAY NETWORK USING RELAY NODES

BACKGROUND

Communication systems allow users to communicate with each other over a network. For example a user may use a user terminal (such as a mobile phone, tablet, laptop, or PC, etc.) to execute a client (or "client application") for accessing the communication system. The client is provided (e.g. downloaded) to the user terminal by a provider of the communication system, and the client comprises software for execution at the user terminal to enable access to the communication system.

The nodes of a communication system may form an overlay network. The nodes may, for example, be clients, servers or relay nodes. An overlay network is a computer network which is built on top of another network. The nodes in the overlay network can be thought of as being connected by virtual or logical links, each of which corresponds to a path, through one or more physical links, in the underlying network. The underlying network may for example be the Internet.

When users use the communication system to engage in bi-directional communication sessions over the overlay network, data may be routed back and forth between the users' clients via a relay node in the overlay network. Relay nodes are used because not all of the nodes within a communication system may be able to communicate directly with each other, e.g. because of their firewall or Network Address Translation (NAT) settings. They can use a relay node which may have fewer restrictions in order to intermediate the communication. In this way, relay nodes are used to make communication feasible between nodes which may not be able to communicate directly with each other. The relay node may be chosen to minimize the round trip time (RTT) in the bi-directional communication session over the overlay network between the users' clients.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method by which relay nodes are chosen separately for routing data in different directions in a bi-directional communication session over an overlay network between a first node and a second node. A plurality of one-way performance measurements are determined for routing data in the communication session in a first direction from the first node to the second node via a respective plurality of relay nodes of the overlay network. Based on the determined one-way performance measurements, one or more of the relay nodes is selected for use in routing data in the first direction from the first node to the second node. Data is routed in the communication session in the first direction from the first node to the second node over the overlay network via the one or more selected relay nodes. The selection of the one or more relay nodes for use in routing data in the first direction is performed separately to a selection of one or more relay nodes for use in routing data in a second direction from the second node to the first node in the communication session.

A corresponding, but separate, method may be applied to select one or more relay nodes for routing data in the second direction in the communication session. That is, a second plurality of one-way performance measurements may be determined for routing data in the communication session in the second direction from the second node to the first node via a respective plurality of relay nodes of the overlay network. Based on the second plurality of determined one-way performance measurements, one or more of said relay nodes is selected for use in routing data in the second direction from the second node to the first node. Data is routed in the communication session in the second direction from the second node to the first node over the overlay network via the one or more selected relay nodes for the second direction. The selection of the one or more relay nodes for use in routing data in the second direction is performed separately to the selection of the one or more relay nodes for use in routing data in the first direction in the communication session.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Figure 1:
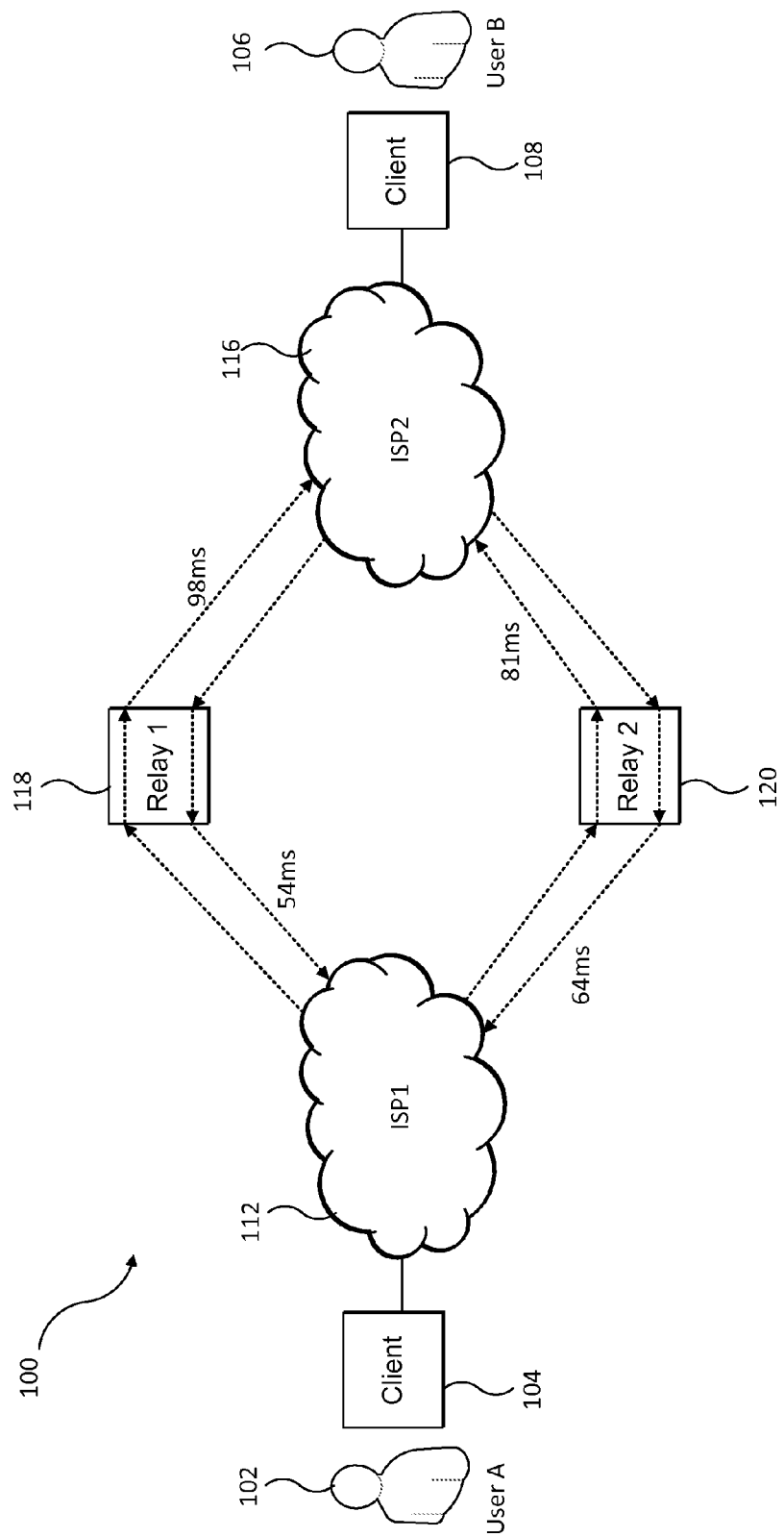
FIG. 1 shows a schematic illustration of a communication system.

FIG. 1 shows nodes of an overlay network of a communication system 100. The overlay network may, for example, be a peer-to-peer (P2P) network. A first user 102 ("User A") uses a client 104 to access the communication system 100. The client 104 comprises software which when executed on a user terminal (such as a mobile phone, tablet, laptop or PC, etc.) performs the functions necessary to allow the user 102 to connect to the communication system 100. Similarly, a second user 106 ("User B") uses a client 108 to access the communication system 100. The client 108 comprises software which when executed on a user terminal (such as a mobile phone, tablet, laptop or PC, etc.) performs the functions necessary to allow the user 106 to connect to the communication system 100. The clients 104 and 108 are provided (e.g. downloaded) to user terminals of the respective users 102 and 106 by a provider of the communication system 100.

The client 104 is arranged to communicate via a first Internet Service Provider (ISP) 112. The user terminal on which the client 104 is executed includes at least a processor for executing the client 104, a memory for storing data, and a network interface for connecting to the Internet, such that the client 104 can communicate via the ISP 112. In the communication system 100 shown in FIG. 1, all of the data relating to the communication system 100 which is to be sent to and from the client 104 is routed via the ISP 112. Similarly, the client 108 is arranged to communicate via a second Internet Service Provider (ISP) 116. The user terminal on which the client 108 is executed includes at least a processor for executing the client 108, a memory for storing data, and a network interface for connecting to the Internet, such that the client 108 can communicate via the ISP 116. In the communication system shown in FIG. 1, all of the data relating to the communication system 100 which is to be sent to and from the client 108 is routed via the ISP 116. The communication system 100 may, or may not, be a server-based communication system.

The overlay network of the communication system 100 includes a first relay node 118 and a second relay node 120. Data can be routed over the overlay network between the client 104 of the ISP 112 and the client 108 of the ISP 116 via either the relay node 118 or the relay node 120. The relay nodes 118 and 120 can be situated on any network (e.g. in another ISP) and there can be a plurality of networks between any of the networks. It is noted that the Internet is a network of networks which may be able to communicate with each other. The overlay network of the communication system 100 may include many more nodes than those shown in FIG. 1. In particular, the overlay network of the communication system 100 may include more than two relay nodes via which data may be routed between the client 104 and the client 108, but for clarity only the two relay nodes 118 and 120 are shown in FIG. 1 and described herein. The relay nodes 118 and 120 may be relay servers or P2P relay nodes (e.g. other user terminals in the network).

In operation, the two users 102 and 106 engage in a bi-directional communication session with each other over the communication system 100. Data is transmitted from the client 104 to the client 108 via: (i) the ISP 112, (ii) one of the relay nodes 118 and 120, and (iii) the ISP 116. Similarly, data is transmitted from the client 108 to the client 104 via: (i) the ISP 116, (ii) one of the relay nodes 118 and 120, and (iii) the ISP 112.

The communication session may be a real-time media session, wherein the data transmitted in the communication session is real-time media data. For example, the communication session may be a call between the users 102 and 106.

FIG. 1 illustrates how data packets travelling from the client 104 to the client 108 can follow one of two possible paths, either via relay node 118 or via relay node 120. The choice of the peering used to hand off the data packets from ISP1 112 usually depends on the peering agreements available at ISP1 112 and the actual routing is often based on the target address and most often follows some predetermined routing policy (hot potato routing, cold potato routing etc.). There may be a large selection of relay candidates available on the overlay network, although only two relay nodes 118 and 120 are shown in FIG. 1 for clarity. It is possible to influence the peering used by selecting a relay node (target address) in a particular network of the underlying network (e.g. Internet), hence controlling which exit point the packets take from ISP1 112 or any other networks of the underlying network (e.g. Internet) along the way.

The determination as to the routing of data from the client 104 to the client 108 may be performed by the client 104. The application level logic on the client 104 makes the decision for routing on the overlay network. The route is decided on the client application 104 by selecting a relay node (which through its address influences the path that the packets take through the system 100). A relay node is chosen with a specific ip address, and then the ISP 112 may route data out of its network through a different peering point than in the case of the rest of the addresses. This may be because the ISP 112 has a direct peering agreement with the specific network and hence has a preferential path there as opposed to sending it to the default gateway where all the traffic goes (which is more likely to be congested). Similarly, the determination as to the routing of data from the client 108 to the client 104 may be performed by the client 108 in a corresponding manner as described above in relation to the routing decided by the client 104.

It is noted that the route taken on the underlying network (e.g. Internet) between any of the nodes of the network shown in FIG. 1 may be asymmetric. That is, the path taken by data packets through the underlying network in one direction between two nodes may not be the same as the path taken by data packets through the underlying network in the other direction between those same two nodes. For example, data packets routed from the ISP 112 to the ISP 116 via relay node 118 do not necessarily traverse the same set of networks on the underlying network (e.g. Internet) as packets routed from the ISP 116 to the ISP 112 via the same relay node 118. For example, data packets routed from the ISP 112 to the ISP 116 via relay node 118 may pass through networks Z, U and X of the Internet, whereas data packets routed from the ISP 116 to the ISP 112 via relay node 118 may pass through networks Z, Y and X of the Internet instead. This, and the general asymmetry in Internet traffic (which spawns asymmetrical congestion in the network), may result in different latencies for data packets travelling from Client 104 to Client 108 compared to latencies for data packets travelling in the opposite direction.

A relay node may be chosen based on the average or expected RTT (round trip time) of data packets travelling between nodes in the overlay network. For example, as shown in FIG. 1, the average time taken for data to travel from the client 104 to the client 108 via the relay node 118 is 98 ms and the average time taken for data to travel from the client 108 to the client 104 via the relay node 118 is 54 ms, so in the example shown in FIG. 1 traversing the upper path would result in an average RTT of 152 ms (98+54). Furthermore, in the example shown in FIG. 1 the average time taken for data to travel from the client 104 to the client 108 via the relay node 120 is 81 ms and the average time taken for data to travel from the client 108 to the client 104 via the relay node 120 is 64 ms, so in the example shown in FIG. 1 traversing the lower path would result in an average RTT of 145 ms (81+64). This would suggest that the lower path has lower latency, because it has the lower RTT, and thus would result in a better user experience than the upper path. In this case when choosing the relay node 120 such that the lower path would be used, the client 108 would see data packets arriving from the client 104 with 81 ms latencies while the client 104 would see data packets arriving from the client 108 with 64 ms latencies. The specific average times shown in FIG. 1 are by way of example only. The times given in the example described above are average times, so for each data packet the actual time may differ from the average times due to, for example, jitter.

However, as an improvement to the method described above which is based on the RTT of data packets, according to methods described herein a relay node selected for use in routing data in a first direction in a communication session may be different to the relay node selected for use in routing data in a second direction (opposite to the first direction) in the communication session. That is, when a relay node is selected for routing data, the direction in which the data will travel is considered.

When the media direction is considered and the routing of data in different directions is considered separately, in the example shown in FIG. 1, the data travelling from the ISP 116 to the ISP 112 would experience a lower latency moving through the upper path (i.e. via the relay node 118) instead of the lower path (i.e. via the relay node 120). Hence instead of using a single relay to relay media in both directions, multiple relay nodes are considered for each direction separately and a combination of relay nodes is chosen that delivers the best quality (e.g. least latency) to both endpoints depending on the direction of media transfer. This way the experience for ISP 116 (and therefore client 108) would stay the same as in the example given above (that is, 81 ms routing via the relay node 120 in the lower path), but ISP 112 (and therefore client 104) would see a lower latency, at an average latency of 54 ms (instead of 64 ms) in its received media stream routed via the relay node 118 in the upper path.

For simplicity, the example described above uses only latency as a predictor/measurement of the performance/quality delivered to the end user, but the performance measurement can be any suitable metric, such as a bandwidth measurement, a jitter measurement, a packet loss measurement or a combination of multiple metrics. For example an average of a collection of measurements may be used. The performance measurements may be a real-time measurement of a current value (i.e. an active measurement at selection), or a performance measurement from the past which has been stored at the routing node. For example, a nonlinear network quality model could be used to provide the performance measurement, wherein the nonlinear network quality model combines bandwidth, jitter, packet loss and one-way delay. In this way, the performance measurement gives an indication of the end user perceived quality of the data flowing in only one direction on a particular path. By using multiple relays (i.e. different relay nodes for different directions) for a one-to-one call and optimizing the choice of relay node depending on the direction of media, the end user experience can be improved.

Figure 2:
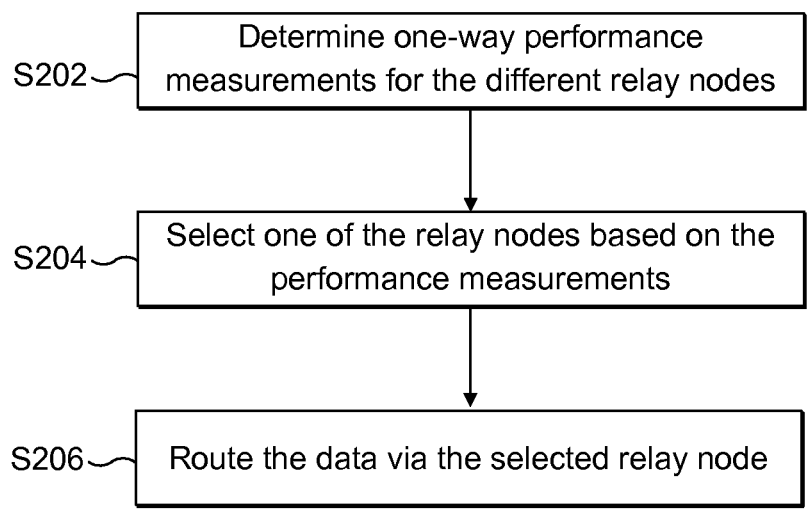
FIG. 2 is a flow chart for a process of routing data in a bi-directional communication session over an overlay network.

FIG. 2 shows a flow chart for a process of determining routing of data in a bi-directional communication session over the overlay network of the communication system 100. The method may be performed at the client 104 for routing data to the client 108 via either the relay node 118 or the relay node 120 in a call between the users 102 and 106 over the communication system 100.

The client 104 intends to send data to the client 108, e.g. as part of a call between the users 102 and 106. In step S202 the client 104 determines a one-way performance measurement for routing data from the client 104 to the client 108 via the relay node 118 and the client 104 determines a one-way performance measurement for routing data from the client 104 to the client 108 via the relay node 120. As described above, the performance measurements may be for example latency, bandwidth, jitter, packet loss measurements or a combination of such measurements. A one-way performance measurement is determined for each relay node.

In other embodiments, an application other than the client 104 may determine the one-way performance measurements for routing data from the client 104 to the client 108. For example the one-way performance measurements could be performed by a different application residing on the network prior to step S202, and in that case step S202 comprises retrieving the already determined one-way performance measurements from the node that determined them. In the embodiments in which the client 104 performs the active measuring of the one-way performance measurements, the measurements are more up-to-date and useful. However, in essence the connections between networks do not change very often and it is sufficient for the client 104 to retrieve the average connectivity estimates (e.g. in terms of one way latencies between networks) and this data can be gathered by other means before the routing decisions are actually made. In one example, the client 104 may retrieve the one-way performance measurements from a table that captures the aggregate delays and decide that the two endpoints should be relayed through network X as opposed to network Y because there is evidence that the delay is smaller when communicating through network X compared to when communicating through network Y.

For example, where the performance measurements are latency measurements then a time stamp may be included in the data prior to routing the data from the client 104 to the client 108. The time stamp may be included in the data by the client 104. The client 108 can measure a time at which it receives the data. Based on that measured time and the time stamp included in the data, the time taken to route the data from the client 104 to the client 108 can be determined. This may be determined by the client 108 and then sent back to the client 104 or the measurement of the time at which the client 108 receives the data may be sent back to the client 104 so that the client 104 can perform the determination of the time taken to send the data from the client 104 to the client 108. The time taken to send the data from the client 104 to the client 108 is determined for each route (i.e. via relay node 118 and via relay node 120 in the example shown in FIG. 1). In order for this method to work effectively, the endpoints of the data communication should be time synched with each other (i.e. they should have their clocks synchronised). In other examples, each route may include more than one relay node. The one-way latency measurements may be implemented in other ways than in the example described above.

In step S204 the client 104 selects one of the relay nodes (118 or 120) based on the determined performance measurements. The selection is performed to provide the best user-experience, for example the selection may be performed to minimise the latency of the data transfer.

In step S206 the data is routed from the client 104 to the client 108 via the ISP 112 and the ISP 116 and via the indicated selected relay node, that is via either relay node 118 or relay node 120.

The relay node is selected in step S204 to provide the best performance based on the performance measurements determined in step S202. For example, when the performance measurements are latency measurements, the selected relay node may correspond to the lowest latency. In the example, shown in FIG. 1, step S204 will select relay node 120 to route data from the client 104 to the client 108 based on the lower latency for that route (81 ms compared to 98 ms for routing the data via the relay node 118).

A corresponding method to that described above in relation to FIG. 2 can also be implemented at the client 108 for routing data from the client 108 to the client 104 in the communication session.

The client 108 intends to send data to the client 104, e.g. as part of a call between the users 102 and 106.

In a step corresponding to step S202, the client 108 determines a one-way performance measurement for routing data from the client 108 to the client 104 via the relay node 118 and the routing node 114 determines a one-way performance measurement for routing data from the client 108 to the client 104 via the relay node 120. As described above, the performance measurements may be for example latency, bandwidth, jitter, packet loss measurements or a combination of such measurements. A one-way performance measurement is determined for each relay node.

For example, where the performance measurements are latency measurements then a time stamp may be included in the data prior to routing the data from the client 108 to the client 104. The time stamp may be included in the data by the client 108. The client 104 can measure a time at which it receives the data. Based on that measured time and the time stamp included in the data, the time taken to send the data from the client 108 to the client 104 can be determined.

This may be determined by the client 104 and then sent back to the client 108 or the measurement of the time at which the client 104 receives the data may be sent back to the client 108 so that the client 108 can perform the determination of the time taken to route the data from the client 108 to the client 104. The time taken to send the data from the client 108 to the client 104 is determined for each route (i.e. via relay node 118 and via relay node 120 in the example shown in FIG. 1). In order for this method to work effectively, the endpoints of the data communication should be time synched with each other (i.e. they should have their clocks synchronised). The one-way latency measurements may be implemented in other ways than in the example described above.

In a step corresponding to step S204, the client 108 selects one of the relay nodes (118 or 120) based on the determined performance measurements for routing data from the client 108 to the client 104. The selection is performed to provide the best user-experience, for example the selection may be performed to minimise the latency of the data transfer.

In a step corresponding to step S206, the data is routed from the client 108 to the client 104 via the ISP 116 and the ISP 112 and via the indicated selected relay node, that is via either relay node 118 or relay node 120.

In the examples given above, one relay node is selected in step S204. In other examples, more than one (e.g. ten) relay nodes could be selected, e.g. from a pool of approximately a thousand possible relay nodes. The data packets can then be routed in parallel via the selected relay nodes.

The relay node is selected to provide the best performance based on the determined performance measurements. For example, when the performance measurements are latency measurements, the selected relay node may correspond to the lowest latency. In the example, shown in FIG. 1, relay node 118 will be selected to route data from the client 108 to the client 104 based on the lower latency for that route (54 ms compared to 64 ms for routing the data via the relay node 120).

More than one performance measurement may be considered in the step of selecting a relay node for routing the data. For example, the latency and the packet loss may be measured for each route and used to select a route for routing the data.

It can therefore be seen that the method to select the relay node for routing data from the client 104 to the client 108 is performed separately from the method to select the relay node for routing data from the client 108 to the client 104. That is, the selection of a relay node for routing data in one direction is performed independently of the route of data transmitted in the other direction in the communication session. In other words, the route of the data in the bi-directional communication session is optimized for each direction independently. In a real-time media stream data packets are sent in one direction and only control packets are sent in the reverse direction. The control packets may for example indicate how many data packets have successfully been received, etc. In a two-way real-time media session the same established transport channel (session) could be used to exchange media in both directions, but with a single session between endpoints where both endpoints are sending media, the control packets on the reverse direction may share the session with data in the opposite direction (in case of a multiplexed protocol). Different routes may be suited to the different types of packets, i.e. data packets and control packets, and thus the path should be chosen such as to optimize media delivery on a specific direction.

In methods described herein multiple relay nodes are used in a bi-directional communication session depending on the direction of traffic. As described above, the overlay network of the communication system 100 may be a P2P network.

As described above, only two relay nodes (118 and 120) are shown in FIG. 1 and described in the examples above. However, any number of relay nodes may be available in the overlay network. Furthermore, each of the routes shown in FIG. 1 includes just one relay node. In other examples a route may include one or more relay nodes. It may be the case that in a server-based communication system there are fewer available relay nodes (e.g. there may be approximately ten to fifty datacenters to choose from, or thousands of edge compute nodes in the cloud) than in a fully P2P communication system (which may have e.g. a global selection pool of more than ten million relay candidates).

The topology for stream sessions carrying real-time media is optimized for the direction of the media since network characteristics on the media direction have a higher correlation to the perceived user experience than the network characteristics on the return path used for acknowledgement packets. In order to benefit from this asymmetry, the overlay network uses multiple and different relay nodes (e.g. relay servers) for a single call based on the direction of the media as opposed to always using the same relay node for media in both directions. The selection of the relay nodes can be carried out based on one-way latency measurements in distinct selection processes for each direction of data travel in the communication session. Such an optimization will result in improved experience for the users involved in a real-time media session.

The communication between the client 104 and the communication system 100 occurs via the ISP 112, and similarly the communication between the client 108 and the communication system 100 occurs via the ISP 116. The communication system 100 may not be a server-based communication system 100 such that the clients 104 and 108 can communicate with the communication system 100 without routing data via respective servers. The logic for making the routing decisions is implemented in the clients 104 and 108. In order to implement the routing decision, the client 104 has collected enough statistics about one way delay measurements between different networks to know which network to propose relay candidates from (taking into account the direction of media) for optimal quality.

Generally, any of the functions described herein (e.g. the functional steps shown in FIG. 2) can be implemented in modules using software, firmware, hardware (e.g., fixed logic circuitry), or a combination of these implementations. The steps shown separately in FIG. 2 may or may not be implemented as separate modules or steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of asymmetrically routing data in a bi-directional communication session over a network between a first node and a second node, the method comprising:
   determining a first plurality of one-way performance measurements for routing data in the bi-directional communication session in a first direction from the first node to the second node via a respective plurality of relay nodes of the network that are available for routing data in the first direction and determining a second plurality of one-way performance measurements for routing data in the bi-directional communication session in a second direction via a respective plurality of relay nodes of the network that are available for routing data in the second direction, each one-way performance measurement including at least one of a latency measurement, a bandwidth measurement, a jitter measurement, or a packet loss measurement, each one-way performance measurement retrieved from a node other than the first node thereby indicating a quality of the bi-directional communication session via different respective relay nodes of the respective plurality of relay nodes;
   based on the first plurality of one-way performance measurements, selecting a first set of one or more relay nodes that are available for routing data in the first direction for use in routing data in the first direction from the first node to the second node based on one or more of an average or expected round trip time for communication between the first node and the second node;
   based on the second plurality of one-way performance measurements, selecting a second set of one or more of the relay nodes that are available for routing data in the second direction for use in routing data in the second direction from the second node to the first node, wherein said selecting of the first set of one or more relay nodes for routing data for the bi-directional communication session in the first direction is performed independently from said selecting the second set of one or more relay nodes for routing data for the bi-directional communication session in the second direction from the second node to the first node; and
   routing data in the bi-directional communication session in the first direction from the first node to the second node over the network via the first set of one or more relay nodes that are available for routing data in the first direction.

2. The method of claim 1 wherein the first set of one or more relay nodes selected for use in routing data in the first direction in the bi-directional communication session are different to the second set of one or more relay nodes selected for use in routing data in the second direction in the bi-directional communication session.

3. The method of claim 1 wherein the data is real-time media data, and wherein the bi-directional communication session is a real-time media session.

4. The method of claim 3 wherein the real-time media session is a call between users over the network.

5. The method of claim 1 wherein the network is an overlay network operating on top of the Internet.

6. The method of claim 1 further comprising obtaining at the first node data communicated in the second direction from the second node to the first node and routed according to the second set of one or more relay nodes for use in routing data in the second direction.

7. The method of claim 1 wherein the data routed for the bi-directional communication session in the first direction comprises communication data packets and the data routed for the bi-directional communication session in the second direction comprises control data packets.

8. The method of claim 1 wherein the first node is a first client associated with a first user, and wherein the second node is a second client associated with a second user, and wherein the bi-directional communication session is a bi-directional communication session between the first client and second client, thereby allowing the first user and second user to communicate with each other.

9. The method of claim 1 wherein the first node is a client device and the method is implemented on the client device.

10. The method of claim 1, further comprising routing data in the bi-directional communication session in the second direction from the second node to the first node over the network via the second set of the one or more relay nodes.

11. The method of claim 1, further comprising receiving at the first node data communicated in the bi-directional communication session in the second direction over the network from the second node to the first node via the second set of the one or more relay nodes.

12. A first node configured to asymmetrically route data in a bi-directional communication session over a network between the first node and a second node, the first node comprising:
   one or more processors; and
   a memory comprising computer-executable instructions, wherein the computer-executable instructions are executable by the one or more processors to perform operations including:
      determining a plurality of one-way performance measurements for routing data in the bi-directional communication session in a first direction from the first node to the second node via a respective plurality of relay nodes of the network that are available for routing data in the first direction, each of the one-way performance measurements including at least one of a latency measurement, a bandwidth measurement, a jitter measurement, or a packet loss measurement, each of the one-way performance measurements retrieved from a node other than the first node;

selecting one or more of said relay nodes that are available for routing data in the first direction, based on the determined one-way performance measurements and based on one or more of an average or expected round trip time for communication between the first node and the second node, the one or more of said relay nodes selected for use in routing data in the first direction from the node to the second node;

routing data in the bi-directional communication session in the first direction from the first node to the second node over the network via the one or more selected relay nodes that are available for routing data in the first direction;

determining a plurality of one-way performance measurements for routing data in the bi-directional communication session in a second direction from the second node to the first node via a respective plurality of relay nodes of the network that are available for routing data in the second direction;

based on the determined one-way performance measurements for routing data in the bi-directional communication session in a second direction, selecting one or more of said relay nodes that are available for use in routing data in the second direction from the second node to the first node, said selected relay nodes that are available for use in routing data in the second direction being different from the selected relay nodes that are available for routing data in the first direction; and receiving data in the bi-directional communication session in the second direction from the second node over the network via the one or more selected relay nodes that are available for routing data in the second direction.

13. The node of claim 12 wherein the data is real-time media data, and wherein the bi-directional communication session is a real-time media session.

14. The node of claim 13 wherein the real-time media session is a call between users over the network.

15. The node of claim 12 wherein the network is an overlay network operating on top of the Internet.

16. The node of claim 12 wherein the first node is a client associated with a user, and wherein the second node is a second client associated with a second user, and wherein the bi-directional communication session is a bi-directional communication session between the first and second clients, thereby allowing the first and second users to communicate with each other.

17. A computer program product configured to asymmetrically route data in a bi-directional communication session over a network between a first node and a second node, the computer program product being embodied on a computer-readable storage medium and configured so as when executed on a processor to perform the operations of:

determining a first plurality of one-way performance measurements for routing data in the bi-directional communication session in a first direction from the first node to the second node via a respective plurality of relay nodes of the network that are available for routing data in the first direction and determining a second plurality of one-way performance measurements for routing data in the bi-directional communication session in a second direction via a respective plurality of relay nodes of the network that are available for routing data in the second direction, each one-way performance measurement including at least one of a latency measurement, a bandwidth measurement, a jitter measurement, or a packet loss measurement, each one-way performance measurement retrieved from a node other than the first node thereby indicating a quality of the bi-directional communication session via the respective plurality of relay nodes;

based on the first plurality of determined one-way performance measurements, selecting a first set of one or more relay nodes that are available for routing data in the first direction for use in routing data in the first direction from the first node to the second node based on one or more of an average or expected round trip time for communication between the first node and the second node;

based on the second plurality of one-way performance measurements, selecting a second set of one or more of the relay nodes that are available for routing data in the second direction for use in routing data in the second direction from the second node to the first node, wherein said selecting of the first set of one or more relay nodes for routing data for the bi-directional communication session in the first direction is performed independently from said selecting the second set of one or more relay nodes for routing data for the bi-directional communication session in the second direction from the second node to the first node; and routing data in the bi-directional communication session in the first direction from the first node to the second node over the network via the first set of one or more selected relay nodes that are available for routing data in the first direction.

18. The computer program product of claim 17 wherein the data is real-time media data, and wherein the bi-directional communication session is a real-time media session.

19. The computer program of claim 16 wherein the operations further comprise obtaining data communicated in the second direction from the second node to the first node, the data routed according to the second set of one or more relay nodes for use in routing data in the second direction.

20. The computer program of claim 17 wherein the first node is a client device and the computer program is implemented as a communication application on the client device.

* * * * *